(12) United States Patent
Weng et al.

(10) Patent No.: US 12,235,512 B2
(45) Date of Patent: Feb. 25, 2025

(54) OPTICAL MODULE

(71) Applicant: TDK TAIWAN CORP., Taoyuan (TW)

(72) Inventors: Chih-Wei Weng, Taoyuan (TW);
Chao-Chang Hu, Taoyuan (TW);
Kuen-Wang Tsai, Taoyuan (TW);
Tzu-Ying Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 556 days.

(21) Appl. No.: 17/587,814

(22) Filed: Jan. 28, 2022

(65) Prior Publication Data

US 2022/0244484 A1 Aug. 4, 2022

Related U.S. Application Data

(60) Provisional application No. 63/143,344, filed on Jan. 29, 2021.

(51) Int. Cl.
*G02B 7/02* (2021.01)
*G02B 7/09* (2021.01)
*G02B 27/64* (2006.01)
*H04N 23/54* (2023.01)
*H04N 23/55* (2023.01)

(52) U.S. Cl.
CPC .............. *G02B 7/028* (2013.01); *G02B 7/021* (2013.01); *G02B 7/023* (2013.01); *G02B 7/09* (2013.01); *G02B 27/646* (2013.01); *H04N 23/54* (2023.01); *H04N 23/55* (2023.01)

(58) Field of Classification Search
CPC ........ G02B 7/028; G02B 7/021; G02B 7/023; G02B 7/09; G02B 27/646; H04N 23/54; H04N 23/55; H04N 23/52
See application file for complete search history.

(56) References Cited

U.S. PATENT DOCUMENTS

2019/0384146 A1* 12/2019 Dong .................... G02B 7/028
2021/0325627 A1* 10/2021 Ding ..................... G02B 7/028
2023/0244128 A1*  8/2023 Van Den Brink ..... G03B 17/02
                                                               359/820

* cited by examiner

*Primary Examiner* — Collin X Beatty
(74) *Attorney, Agent, or Firm* — MUNCY, GEISSLER, OLDS & LOWE, P.C

(57) ABSTRACT

An optical module is provided. The optical module includes a holder for connecting to an optical element and a heat control assembly used for controlling the temperature of the optical element. The heat control assembly corresponds to the optical element or the holder.

19 Claims, 17 Drawing Sheets

OPTICAL MODULE

CROSS REFERENCE TO RELATED APPLICATIONS

This application claims the benefit of U.S. Provisional Application No. 63/143,344, filed on Jan. 29, 2021, the entirety of which is incorporated by reference herein.

BACKGROUND OF THE INVENTION

Field of the Invention

The present disclosure relates to an optical module.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical module to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical module and how to increase its durability has become an important issue.

BRIEF SUMMARY OF THE INVENTION

An optical module is provided in some embodiments of the present disclosure. The optical module includes a holder for connecting to an optical element and a heat control assembly used for controlling the temperature of the optical element. The heat control assembly corresponds to the optical element or the holder.

In some embodiments, the heat control assembly includes a first heat control element used for isolating heat generated from a heat source transferred to the optical element by heat conduction, and a second heat control element used for dissipating the heat generated by the heat source away from the optical element by heat conduction. The heat conductivity of the first heat control element is less than the heat conductivity of the second heat control element. The distance between the first heat control element and the optical element is less than the distance between the second heat control element and the optical element. The first heat control element is between the optical element and the second heat control element.

In some embodiments, the holder connects to the optical element through a first adhesive element. The first adhesive element is in direct contact with the holder. The first adhesive element is in direct contact with the optical element. The heat conductivity of the first heat control element is less than the heat conductivity of the first adhesive element.

In some embodiments, the material of the first adhesive element includes nonmetal element. The optical element includes a camera lens. The camera lens includes a lens barrel and at least one lens. The material of the lens barrel includes nonmetal material. The heat conductivity of the lens barrel is different from the heat conductivity of the holder.

In some embodiments, the optical module further includes a light adjusting mechanism used for controlling the amount or characteristic of light incident to the optical element, wherein the light adjusting mechanism includes a movable portion used for connecting to a light amount control element, a fixed portion, and a first driving assembly used for driving the movable portion to move relative to the fixed portion. The movable portion is movable relative to the fixed portion.

In some embodiments, the first driving assembly is the heat source. The movable portion and the fixed portion arrange in a main axis. The material of the second heat control element includes metal. The second heat control element is affixed on the fixed portion. The second heat control element is embedded in a bottom of the fixed portion. The material of the bottom includes nonmetal material. The heat conductivity of the lens barrel is higher than the heat conductivity of the holder.

In some embodiments, the second heat control element is exposed from a first surface of the holder facing away from the optical element. The second heat control element is not exposed from a second surface of the holder facing the optical element. The fixed portion further includes a case, and the material of the case includes metal. The distance between the bottom and the optical element is less than the distance between the case and the optical element.

In some embodiments, the second heat control element connects to the case. The heat generated from the heat source is transferred to the case through the second heat control element. The heat conductivity of the bottom is less than the heat conductivity of the case. The heat conductivity of the second heat control element is higher than the heat conductivity of the case. An accommodating space is formed in the case and the bottom and is used for accommodating the movable portion.

In some embodiments, the light amount control element includes a first light amount control unit movably connected to the movable portion, a second light amount control unit movably connected to the movable portion, a third light amount control unit movably connected to the movable portion, and a fourth light amount control unit movably connected to the movable portion.

In some embodiments, when viewed along the main axis, the first light amount control unit includes a first guiding recess extending in a first direction, the second light amount control unit includes a second guiding recess extending in the first direction, the third light amount control unit includes a third guiding recess extending in a second direction, the fourth light amount control unit includes a fourth guiding recess extending in the second direction.

In some embodiments, the movable portion includes a first guiding portion, a second guiding portion, a third guiding portion, and a fourth guiding portion extending in the main axis. The first guiding portion is disposed in the first guiding recess. The second guiding portion is disposed in the second guiding recess. The third guiding portion is disposed in the third guiding recess. The fourth guiding portion is disposed in the fourth guiding recess.

In some embodiments, the first light control unit further includes a first positioning recess and a second positioning recess extending in the second direction. The second light control unit further includes a third positioning recess and a fourth positioning recess extending in the second direction. The third light control unit further includes a fifth positioning recess extending in the first direction. The fourth light control unit further includes a sixth positioning recess extending in the first direction. The case includes a first positioning portion, a second positioning portion, a third positioning portion, a fourth positioning portion, a fifth positioning portion, a sixth positioning portion, a seventh positioning portion, and an eighth positioning portion extending in the main axis.

In some embodiments, the first positioning portion is disposed in the first positioning recess. The second positioning portion is disposed in the second positioning recess. The third positioning portion is disposed in the third positioning recess. The fourth positioning portion is disposed in the fourth positioning recess. The fifth positioning portion and the sixth positioning portion are disposed in the fifth positioning recess. The seventh positioning portion and the eighth positioning portion are disposed in the sixth positioning recess.

In some embodiments, the first positioning portion and the second positioning portion are arranged in the second direction. The third positioning portion and the fourth positioning portion are arranged in the second direction. The fifth positioning portion and the sixth positioning portion are arranged in the first direction. The seventh positioning portion and the eighth positioning portion are arranged in the first direction.

In some embodiments, the first light amount control element, the second light amount control element, the third light amount control element, and the fourth light amount control element forms an opening. When the movable portion rotates in a first dimension until the first guiding portion being in contact with a first stopping portion of the case, the opening has a first size. When the movable portion rotates in a second dimension until the first guiding portion being in contact with a second stopping portion of the case, the opening has a second size. The first dimension and the second dimension are different. The first size and the second size are different.

In some embodiments, wherein the light amount adjusting mechanism further includes a resilient element disposed on the bottom, a magnetic conductive element corresponding to the first driving assembly, and a position sensor corresponding to the first driving assembly. The movable portion further includes a recess, and the resilient element is disposed in the recess. The size of the recess is greater than the size of the resilient element.

In some embodiments, the first driving assembly includes a first driving element and a second driving element used for generating a driving force to move the movable portion relative to the fixed portion. The first driving element and the second driving element are arranged in the main axis. The magnetic conductive element and the first driving element are arranged in the main axis.

In some embodiments, the first driving assembly includes a first driving element and a second driving element used for generating a driving force to move the movable portion relative to the fixed portion. The first driving element and the second driving element are arranged in a direction perpendicular the main axis. The magnetic conductive element and the first driving element are arranged in the direction perpendicular the main axis.

In some embodiments, the first heat control element is a second adhesive element, and the second heat control element is connected to the optical element through the first heat control element. The material of the second adhesive element includes nonmetal material.

In some embodiments, the first heat control element is a gap between the bottom and the optical element. The bottom is affixed on the holder. The bottom is affixed on the holder through a third adhesive element. The heat conductivity of the third adhesive element is different from the heat conductivity of the first adhesive element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
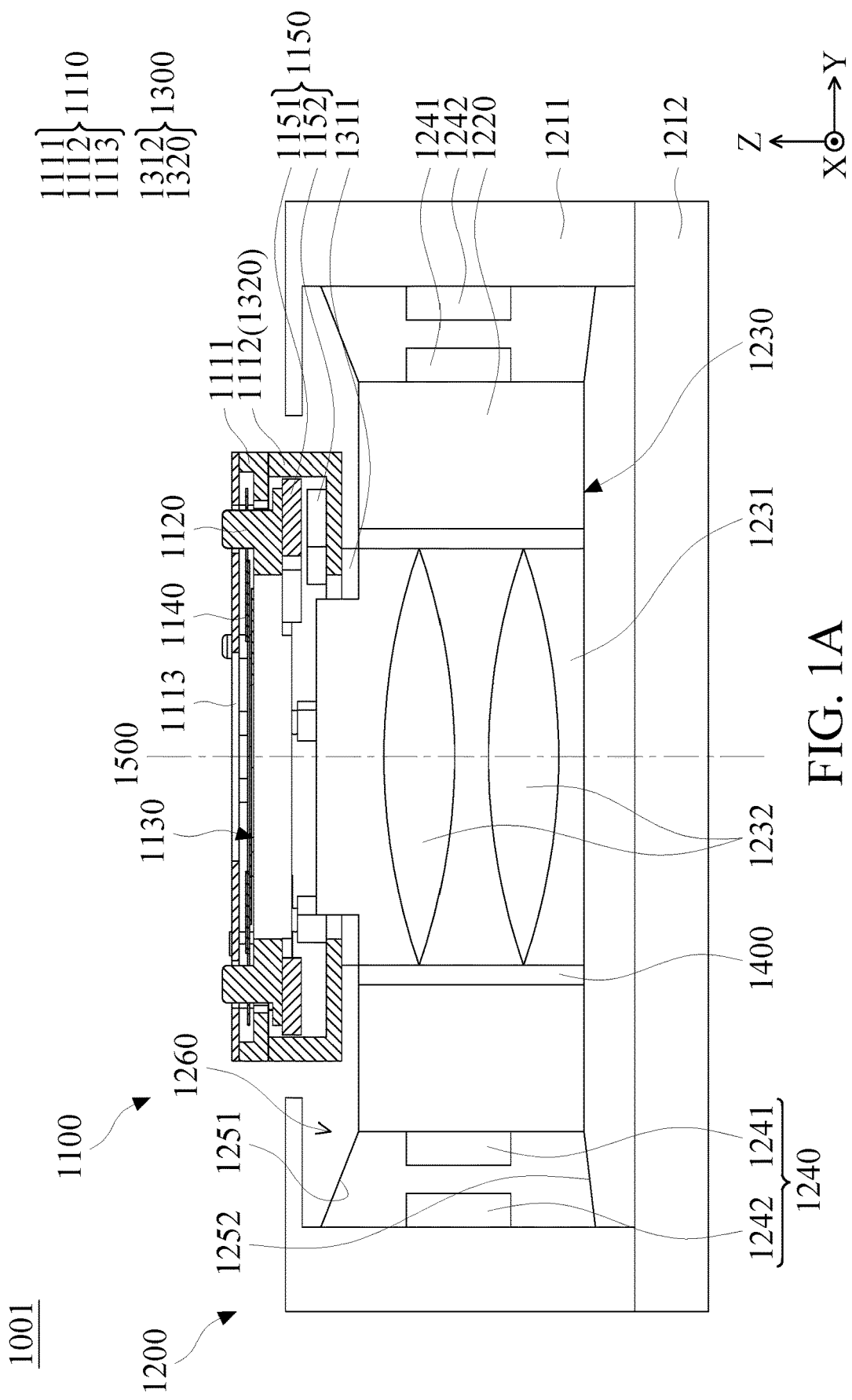
FIGS. 1A and 1C are schematic views of an optical module in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Refer to FIG. 1A. FIG. 1A is a schematic view of an optical module 1001 in some embodiments of the present disclosure. The optical module 1001 may mainly include a light amount adjusting mechanism 1100 and an optical element driving mechanism 1200. An optical element 1230 may be disposed in the optical element driving mechanism 1200, and the optical element driving mechanism 1200 may drive the optical element 1230 to achieve optical image stabilization (OIS) or auto focus (AF). The light amount adjusting mechanism 1100 may be disposed on the optical element driving mechanism 1200 to control the amount or characteristic of light incident to the optical element 1230. For example, the light amount adjusting mechanism 1100 may be an aperture to control the depth of field, imaging quality, and amount of light coming in.

In some embodiments, the optical element 1230 may include a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. For example, when the optical element 1230 is a camera lens, the optical element 1230 may include a lens barrel 1231 and at least one lens 1232. In some embodiments, the lens barrel 1231 may include nonmetal material, and the heat conductivity of the lens barrel 1231 may be different from the heat conductivity of the holder 1220, such as the heat conductivity of the lens barrel 1231 may be higher than the heat conductivity of the holder 1220.

Figure 2A:
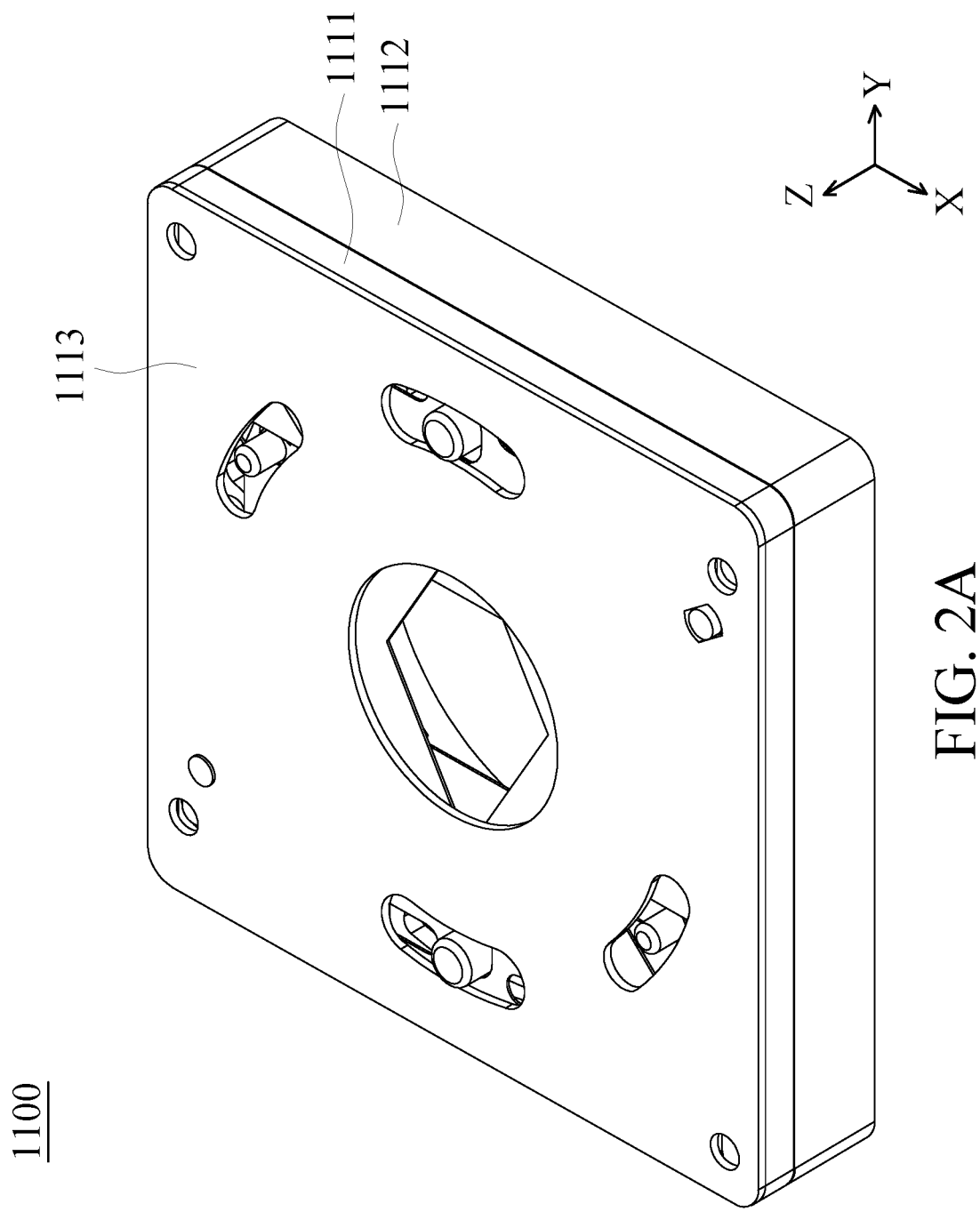
FIG. 2A is a schematic view of the light amount adjusting mechanism.
Figure 2B:
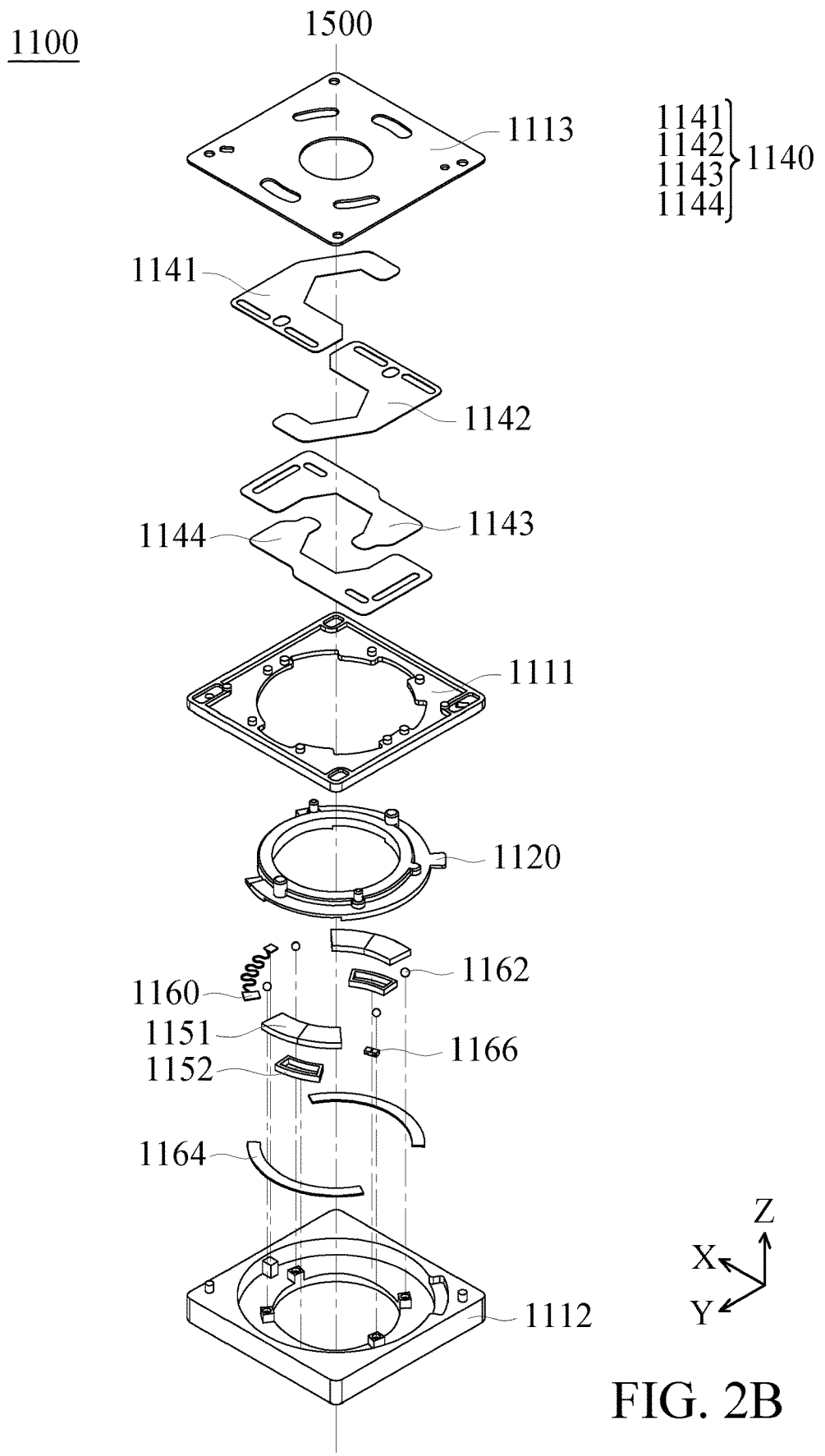
FIG. 2B is an exploded view of the light amount adjusting mechanism.

FIG. 2A is a schematic view of the light amount adjusting mechanism 1100. FIG. 2B is an exploded view of the light amount adjusting mechanism 1100. As shown in FIG. 1A, FIG. 2A, and FIG. 2B, the light amount adjusting mechanism 1100 may mainly include a case 1111, a bottom 1112, a top plate 1113, a movable portion 1120, a light amount control element 1140, a first driving assembly 1150, a third resilient element 1160, a connecting element 1162, a magnetic conductive element 1164, and a position sensor 1166 arranged in a main axis 1500. The case 1111, the bottom 1112, and the top plate 1113 may be called as a fixed portion 1110. The light amount control element 1140 may include a first light amount control unit 1141, a second light amount control unit 1142, a third light amount control unit 1143, and a fourth light amount control unit 1144, or may include other optical control elements such as blades, polarizer, or filter. The case 1111 and the bottom 1112 form a accommodating space 1130 used for accommodating the movable portion 1120, the third resilient element 1160, the connecting element 1162, the magnetic conductive element 1164, and the position sensor 1166, etc. In some embodiments, the distance between the bottom 1112 and the optical element 1230 is less than the distance between the case 1111 and the optical element 1230. The light amount control element 1140 may be outside the accommodating space 1130.

The movable portion 1120 may be used for connecting to the light amount control element 1140 and may move relative to the fixed portion 1110, such as may be movably connected to the bottom 1112 through the connecting element 1162. The first driving assembly 1150 may drive the movable portion 1120 to move relative to the fixed portion 1110. For example, the first driving assembly 1150 may include a first driving element 1151 and a second driving element 1152 disposed on the movable portion 1120 and the fixed portion 1110 (e.g. the bottom 1112), respectively. The first driving element 1151 and the second driving element 1152 may be a combination of a magnet and a coil used for generating a driving force to drive the movable portion 1120 moving relative to the fixed portion 1110. In some embodiments, the first driving assembly 1150 may include other driving elements, such as piezoelectric element or shape memory alloy. The magnetic conductive element 1164 may be used for guiding the magnetic field direction of the first driving element 1151. In some embodiments, as shown in FIG. 1A and FIG. 2B, the first driving element 1151 and the second driving element 1152 may arrange along the main axis 1500, and the magnetic conductive element 1164 and the first driving element 1151 may arrange along the main axis 1500.

The position sensor 1166 may be used for detecting the magnetic field variation of the first driving element 1151 when the first driving element 1151 is moving to get the position of the movable portion 1120 relative to the fixed portion 1110. For example, the position sensor 1166 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the optical element driving mechanism 1200 may mainly include a shell 1211, a base 1212, a holder 1220, and a second driving assembly 1240. The shell 1211 and the base 1212 may be affixed with each other to form a shell of the optical element driving mechanism 1200 for accommodating other elements. The holder 1220 may move relative to the shell 1211 and the base 1212 and may used for connecting to the optical element 1230.

The second driving assembly 1240 may include a third driving element 1241 and a fourth driving element 1242 disposed on the holder 1220 and the shell 1211. The third driving element 1241 and the fourth driving element 1242 may be a combination of a magnet and a coil used for generating a driving force to drive the holder 1220 moving relative to the shell 1211. In some embodiments, the second driving assembly 1240 may include other driving elements, such as piezoelectric element or shape memory alloy.

In some embodiments, the holder 1220 may suspended in the second accommodating space 1260 formed from the shell 1211 and the base 1212 by a first resilient element 1251 and a second resilient element 1252. Therefore, the holder 1220 may movably connected to the shell 1211 through the first resilient element 1251 and the second resilient element 1252.

In some embodiments, when the first driving assembly 1150 drives the movable portion 1120 to move relative to the fixed portion 1110, the first driving assembly 1150 may generate heat. However, excess heat may affect the imaging quality of the optical element 1230. Therefore, a heat control assembly 1300 may be disposed in the optical module 1001 to adjust the temperature of the optical element 1230, so the image quality may be enhanced. In some embodiments, the heat control assembly 1300 may correspond to the holder 1220 or the optical element 1230, and may include a first heat control element 1311, and a second heat control element 1320.

Figure 1B:
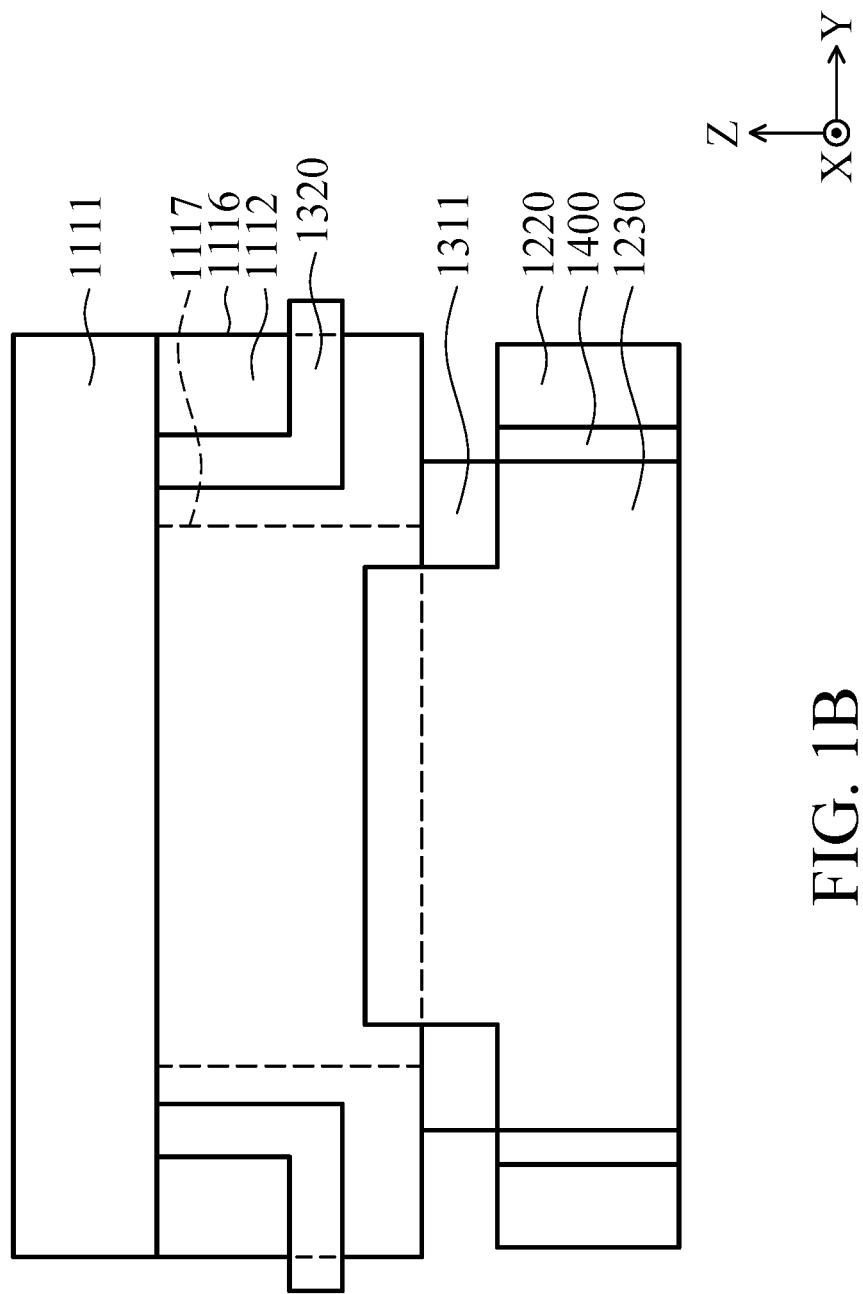
FIGS. 1B and 1D are schematic views of some elements in FIGS. 1A and 1C, respectively.

FIG. 1B is a schematic view of some elements in FIG. 1A. For example, the first heat control element 1311 may isolate heat, and may be disposed between the light amount adjusting mechanism 1100 and the optical element driving mechanism 1200, such as between the optical element 1230 and the light amount adjusting mechanism 1100 to prevent the heat generated from the first driving assembly 1150 (heat source) to the optical element 1230.

The second heat control element 1320 may perform heat conduction or heat dissipation, so the heat generated by the first driving assembly 1150 (heat source) may be taken away from the optical element 1230. In some embodiments, the second heat control element 1320 may include metal, and the bottom 1112 does not include metal, such as the bottom 1112 may include nonmetal materials (e.g. plastic or resin, etc.). For example, the second heat control element 1320 may be affixed on the fixed portion 1110, such as may be embedded in the bottom 1112, may expose from a first surface 1116 of the bottom 1112 facing away from the optical element 1230, and does not expose from a second surface 1117 of the bottom 1112 facing the optical element 1230. In some embodiments, the second heat control element 1320 may connect to the case 1111, and the material of the case 1111 may include metal, so the heat generated from the first driving assembly 1150 may be transferred from the case 1111 by the second heat control element 1320. Afterwards, the heat may be dissipated by the metal case 1111. Moreover, in some embodiments, since the second heat control element 1320 is exposed from the bottom 1112, the heat may be further dissipated from the portion of the second heat control element 1320 exposed from the bottom 1112. Therefore, the optical element 1230 may be prevented from being affected by the heat generated by the first driving assembly 1150.

In some embodiments, the heat conductivity of the first heat control element 1311 is less than the heat conductivity of the second heat control element 1320. The heat conductivity of the bottom 1112 is less than the heat conductivity of the case 1111. The heat conductivity of the second heat control element 1320 is higher than the heat conductivity of the case 1111. In some embodiments, the distance between the first heat control element 1311 and the optical element 1230 is less than the distance between the second heat control element 1320 and the optical element 1230. The first heat control element 1311 is disposed between the optical element 1230 and the second heat control element 1320.

In some embodiments, the first adhesive element 1400 may connect the holder 1220 and the optical element 1230. For example, as shown in FIG. 1A and FIG. 1B, the first adhesive element 1400 may in direct contact with the holder 1220 and the optical element 1230, and the first adhesive element 1400 may include nonmetal material (e.g. plastic or resin). In some embodiments, the first heat control element 1311 may be called as a second adhesive element, and the second heat control element 1320 may be (indirectly) connected to the optical element 1230 through the first heat control element 1311. In some embodiments, the material of the first heat control element 1311 and the first adhesive element 1400 may be different, such the heat conductivity of the first heat control element 1311 may be less than the heat conductivity of the first adhesive element 1400.

Figure 1C:
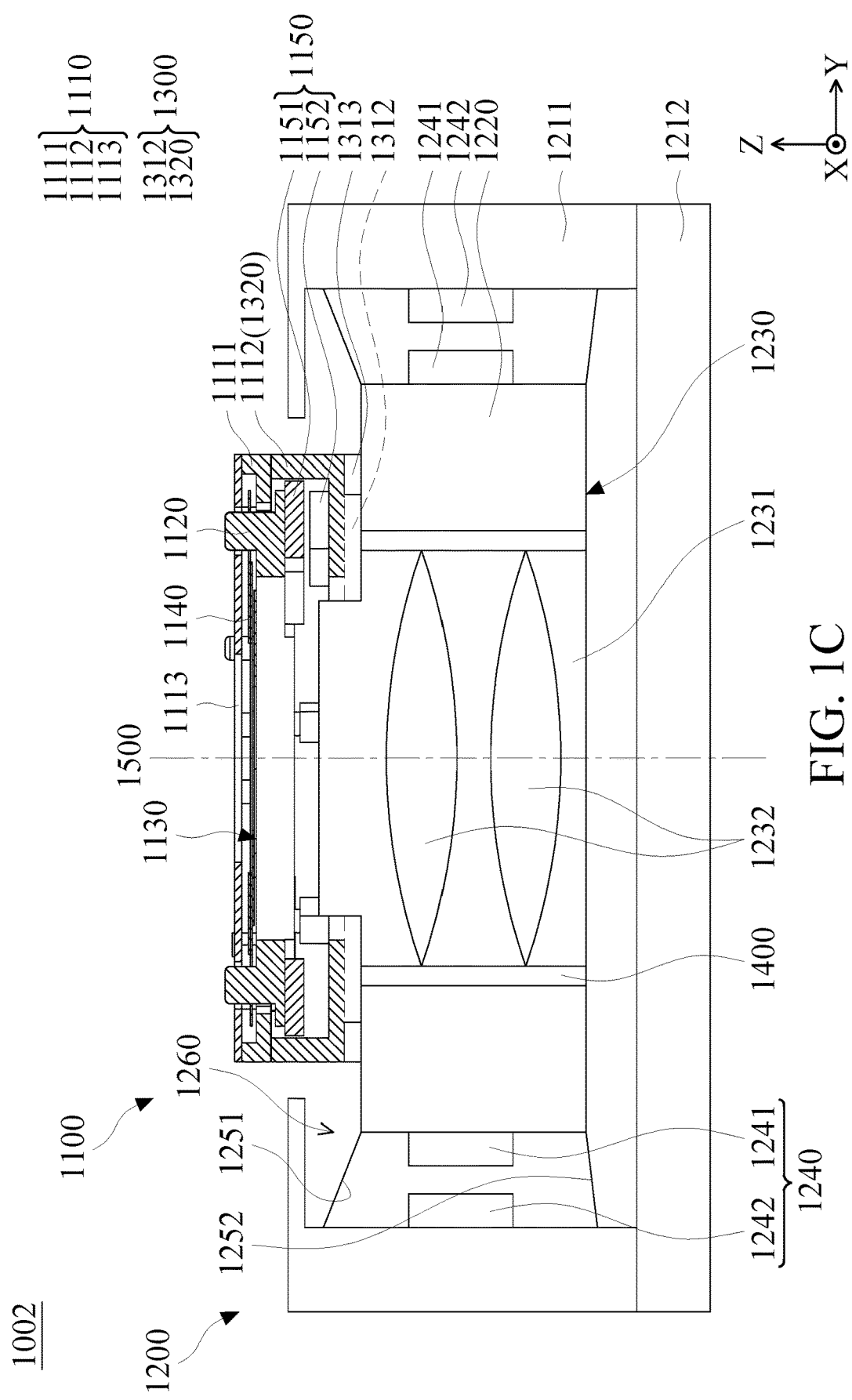
Figure 1D:
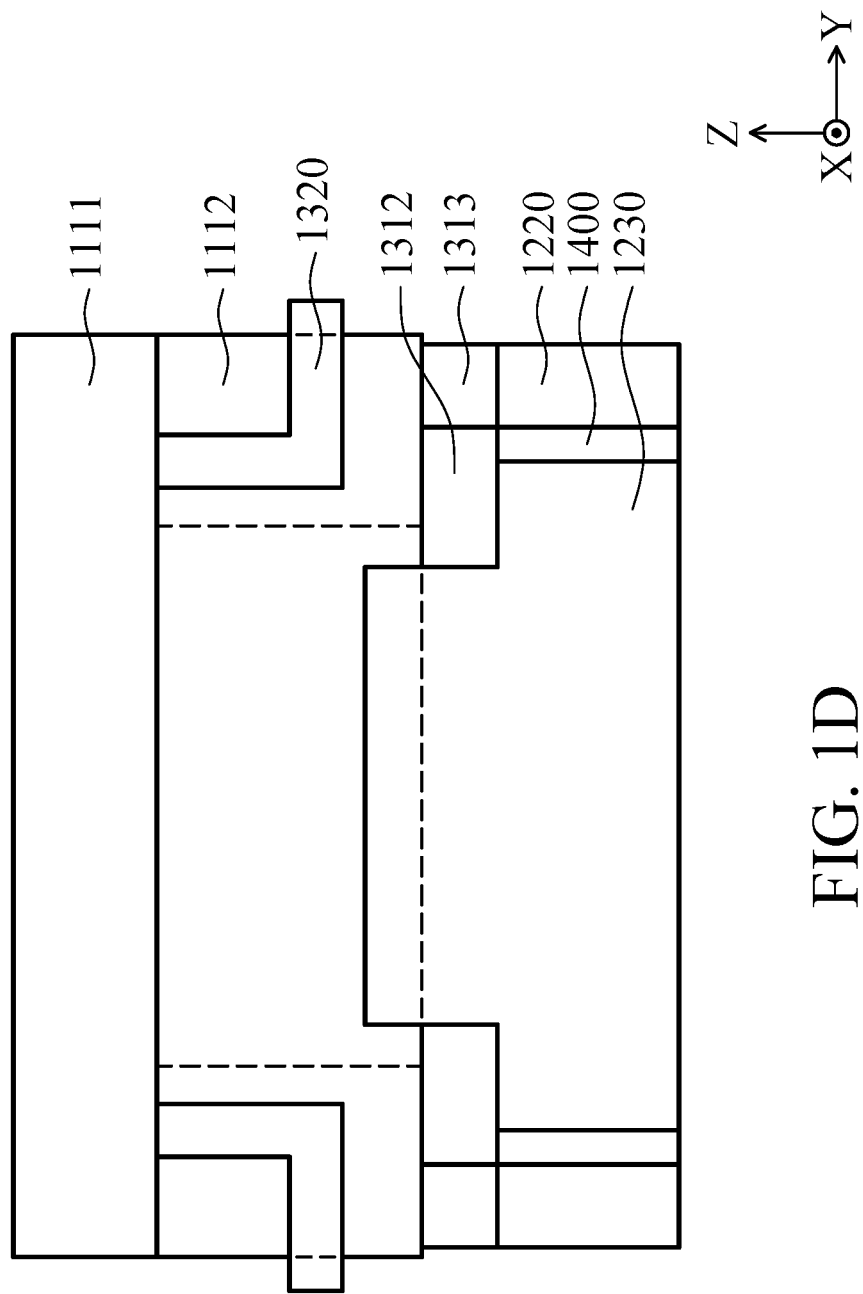

FIG. 1C is a schematic view of an optical module 1002 in some embodiments of the present disclosure. FIG. 1D is a schematic view of some elements in FIG. 1C. In some embodiments, the elements of the optical module 1002 may be substantially similar to the elements of the optical module 1001, and the difference is that a first heat control element 1312 of the optical module 1002 may be a gap positioned between the bottom 1112 and the optical element 1230 to prevent heat conduction. In such embodiment, a third adhesive element 1313 may be used for connecting the bottom 1112 and the holder 1220. The third adhesive element 1313 may be glue or solder material, and the heat conductivity of the third adhesive element 1313 may be different from the heat conductivity of the first adhesive element 1400. This configuration also prevents the heat generated from the first driving assembly 1150 (heat source) to reach the optical element 1230.

Figure 3A:
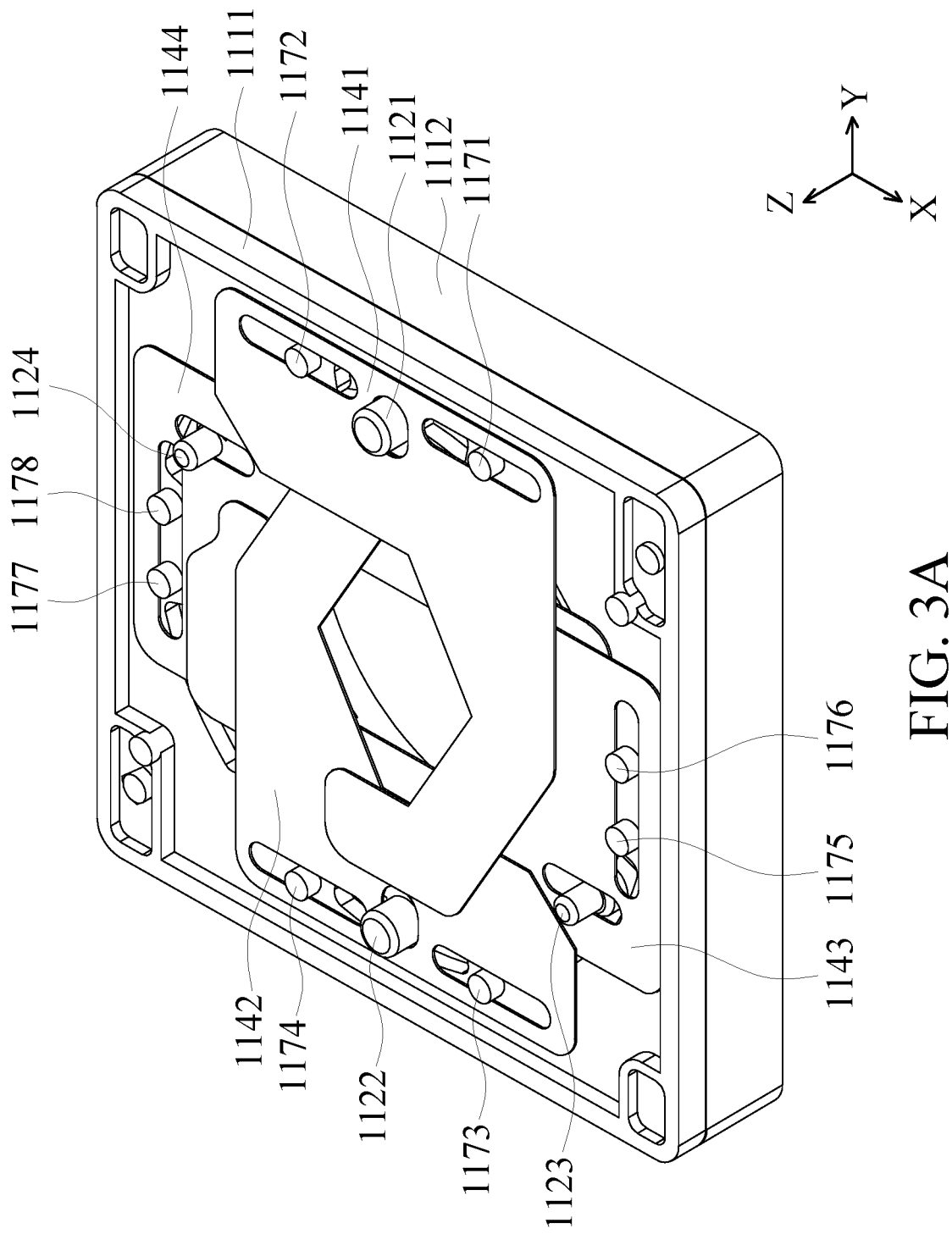
FIG. 3A is a schematic view of some elements of the light amount adjusting mechanism.
Figure 3B:
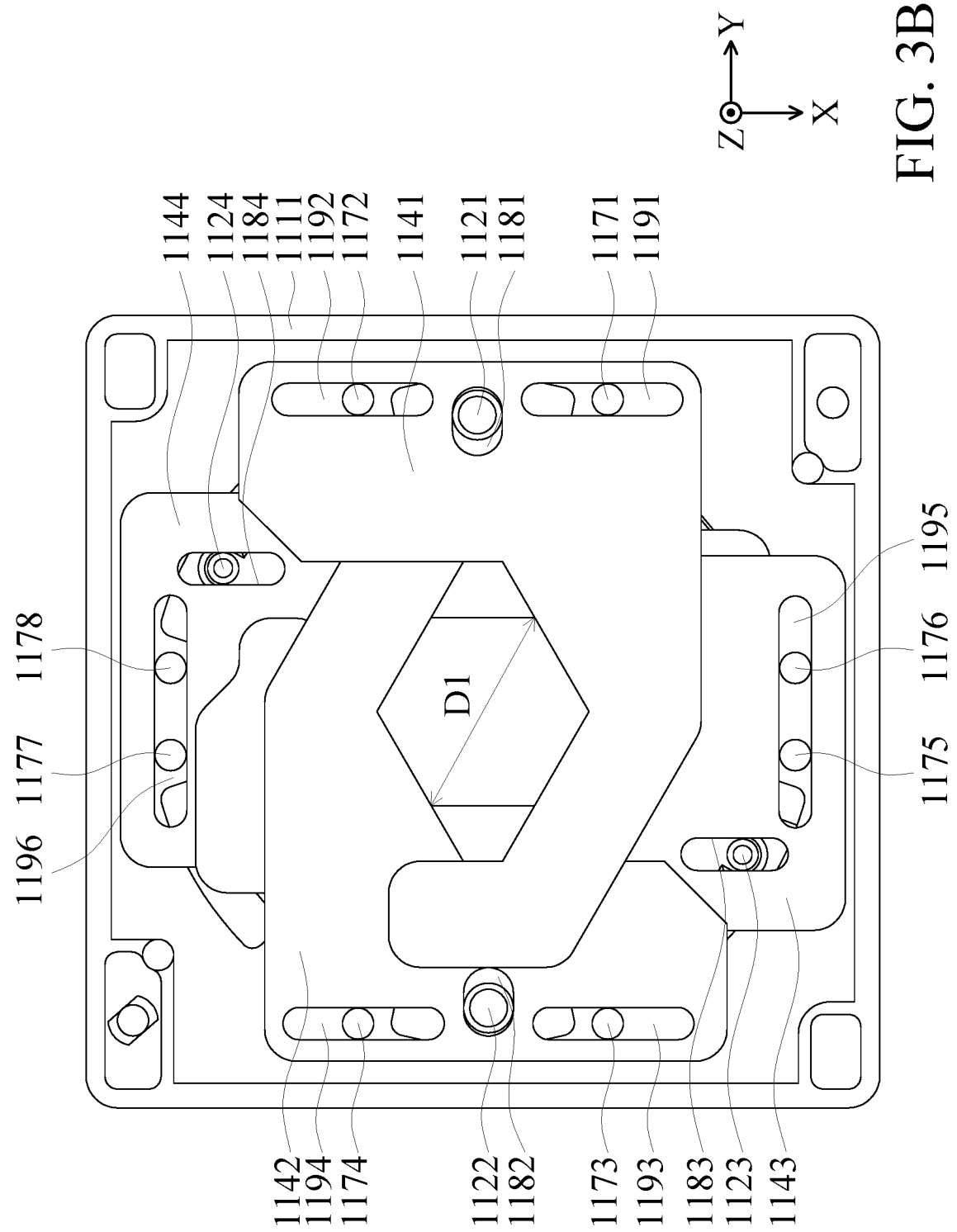
FIG. 3B is a top view of some elements of the light amount adjusting mechanism.
Figure 3C:
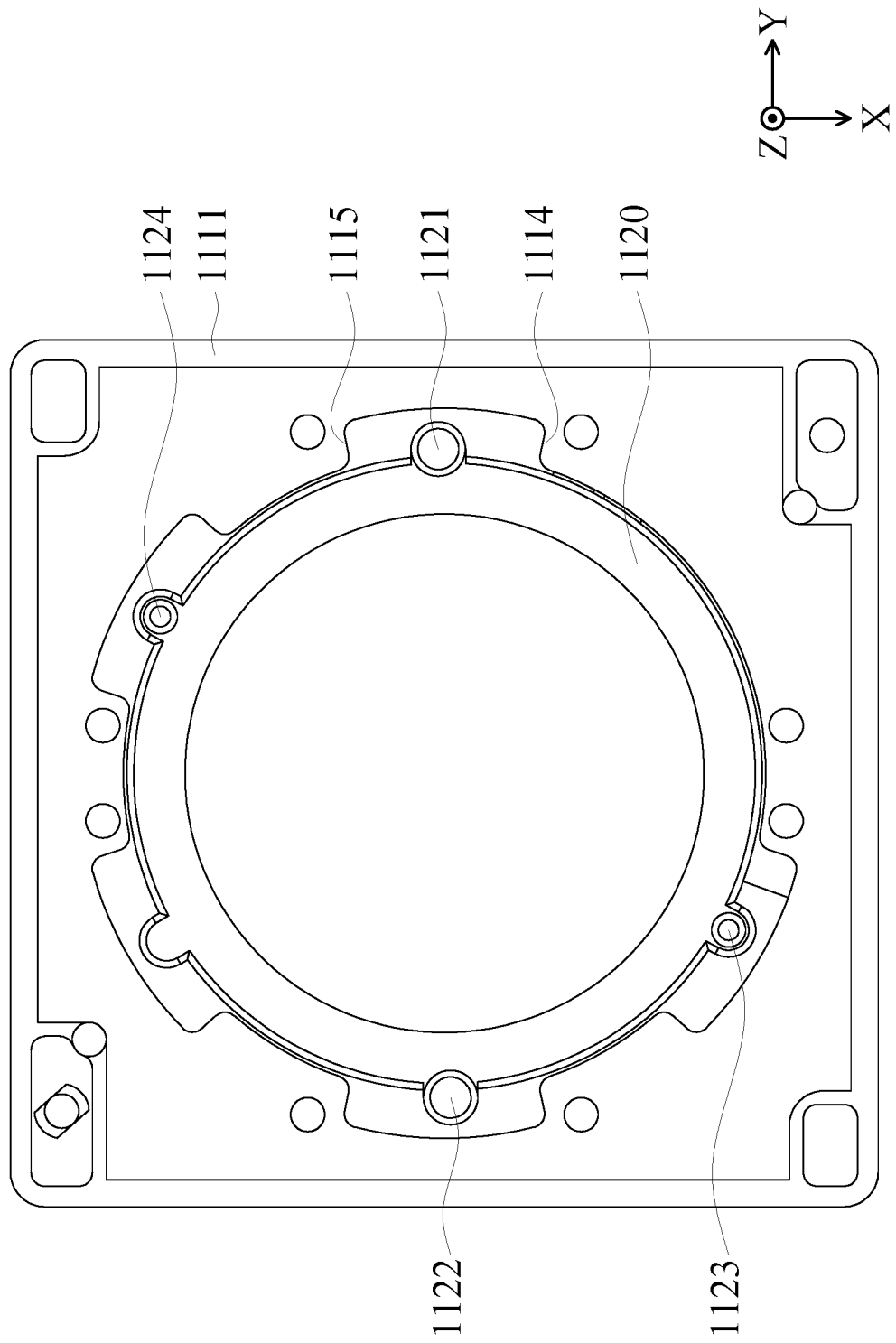
FIG. 3C is a top view of some elements of the light amount adjusting mechanism.
Figure 3D:
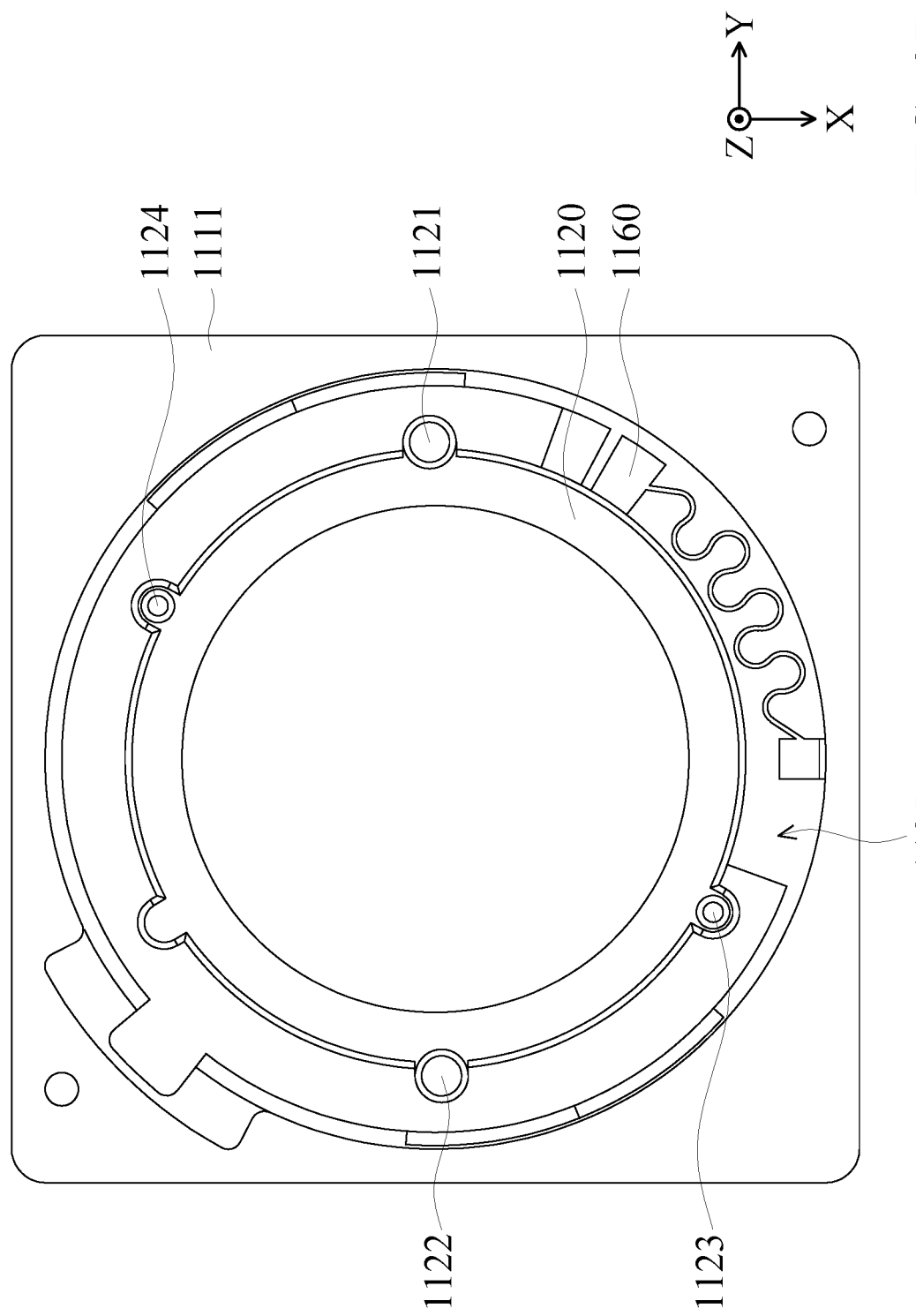
FIG. 3D is a top view of some elements of the light amount adjusting mechanism.

FIG. 3A is a schematic view of some elements of the light amount adjusting mechanism 1100. FIG. 3B is a top view of some elements of the light amount adjusting mechanism 1100, wherein the top plate 1113 is omitted. FIG. 3C is a top view of some elements of the light amount adjusting mechanism 1100, wherein the elements on the case 1111 is omitted. FIG. 3D is a top view of some elements of the light amount adjusting mechanism 1100, wherein the case 1111 and the elements on the case 1111 are omitted.

As shown in FIG. 3A to FIG. 3D, the first light amount control unit 1141, the second light amount control unit 1142, the third light amount control unit 1143, and the fourth light amount control unit 1144 of the light amount control element 1140 may form an opening with a size D1. The opening may be used for allowing light passing through. Moreover, the first light amount control unit 1141, the second light amount control unit 1142, the third light amount control unit 1143, and the fourth light amount control unit 1144 may be movably connected to the movable portion 1120.

Specifically, in some embodiments, when viewed along the main axis 1500, the first light amount control unit 1141 include a first guiding recess 1181 extending in a first direction (e.g. the Y direction). The second light amount control unit 1142 includes a second guiding recess 1182 extending in the first direction. The third light amount control unit 1143 includes a second guiding recess 1182 extending in a second direction (e.g. the X direction). The fourth light amount control unit 1144 may include a fourth guiding recess 1184 extending in the second direction.

Furthermore, the movable portion 1120 may include a first guiding portion 1121, a second guiding portion 1122, a third guiding portion 1123, and a fourth guiding portion 1124 extending in the main axis 1500. The first guiding portion 1121 may be disposed in the first guiding recess 1181, the second guiding portion 1122 may be disposed in the second guiding recess 1182, the third guiding portion 1123 may be disposed in the third guiding recess 1183, and the fourth guiding portion 1124 may be disposed in the fourth guiding recess 1184.

In some embodiments, when the movable portion 1120 rotates, the first guiding portion 1121, the second guiding portion 1122, the third guiding portion 1123, and the fourth guiding portion 1124 may slide in the first guiding recess 1181, the second guiding recess 1182, the third guiding recess 1183, and the fourth guiding recess 1184, respectively, to move the first light amount control unit 1141, the second light amount control unit 1142, the third light amount control unit 1143, and the fourth light amount control unit 1144 in specific directions. Therefore, the size of the opening may be controlled to adjust the size of the aperture.

In some embodiments, the first light amount control unit 1141 may further include a first positioning recess 1191 and a second positioning recess 1192 extending in the second direction (the X direction). The second light amount control unit 1142 may further include a third positioning recess 1193 and a fourth positioning recess 1194 extending in the second direction. The third light amount control unit 1143 may further include a fifth positioning recess 1195 extending in the first direction (the Y direction). The fourth light amount control unit 1144 may further include a sixth positioning recess 1196 extending in the first direction.

In some embodiments, the case 1111 may include a first positioning portion 1171, a second positioning portion 1172, a third positioning portion 1173, a fourth positioning portion 1174, a fifth positioning portion 1175, a sixth positioning portion 1176, a seventh positioning portion 1177, and an eighth positioning portion 1178 extending along the main axis 1500. The first positioning portion 1171 may be disposed in the first positioning recess 1191. The second positioning portion 1172 may be disposed in the second positioning recess 1192. The third positioning portion 1173 may be disposed in the third positioning recess 1193. The fourth positioning portion 1174 may be disposed in the fourth positioning recess 1194. The fifth positioning portion 1175 and the sixth positioning portion 1176 may be disposed in the fifth positioning recess 1195. The seventh positioning portion 1177 and the eighth positioning portion 1178 may be disposed in the sixth positioning recess 1196. The first positioning portion 1171 and the second positioning portion 1172 may arrange in the second direction. The third positioning portion 1173 and the fourth positioning portion 1174 may arrange in the second direction. The fifth positioning portion 1175 and the sixth positioning portion 1176 may arrange in the first direction. The seventh positioning portion 1177 and the eighth positioning portion 1178 may arrange in the first direction.

Therefore, the movable directions of the first light amount control unit 1141, the second light amount control unit 1142, the third light amount control unit 1143, and the fourth light amount control unit 1144 may be controlled by the positioning portions arranged in specific directions. For example, since the first positioning portion 1171 and the second positioning portion 1172 arrange in the second direction, the movable direction of the first light amount control unit 1141 is restricted in the second direction. Moreover, the movable range of the first light amount control unit 1141, the second light amount control unit 1142, the third light amount control unit 1143, and the fourth light amount control unit 1144 may be defined by the first positioning portion 1171, the second positioning portion 1172, the third positioning portion 1173, the fourth positioning portion 1174, the fifth positioning portion 1175, the sixth positioning portion 1176, the seventh positioning portion 1177, and the eighth positioning portion 1178.

As shown in FIG. 3D, the third resilient element 1160 may be disposed on the bottom 1112, the movable portion 1120 may include a recess 1125, and the third resilient element 1160 may be disposed in the recess 1125. The size of the recess 1125 may be greater than the size of the third resilient element 1160. Therefore, the movable range of the movable portion 1120 may be defined by the third resilient element 1160 when the movable portion 1120 rotates in the clockwise direction or in the counterclockwise direction.

Figure 4A:
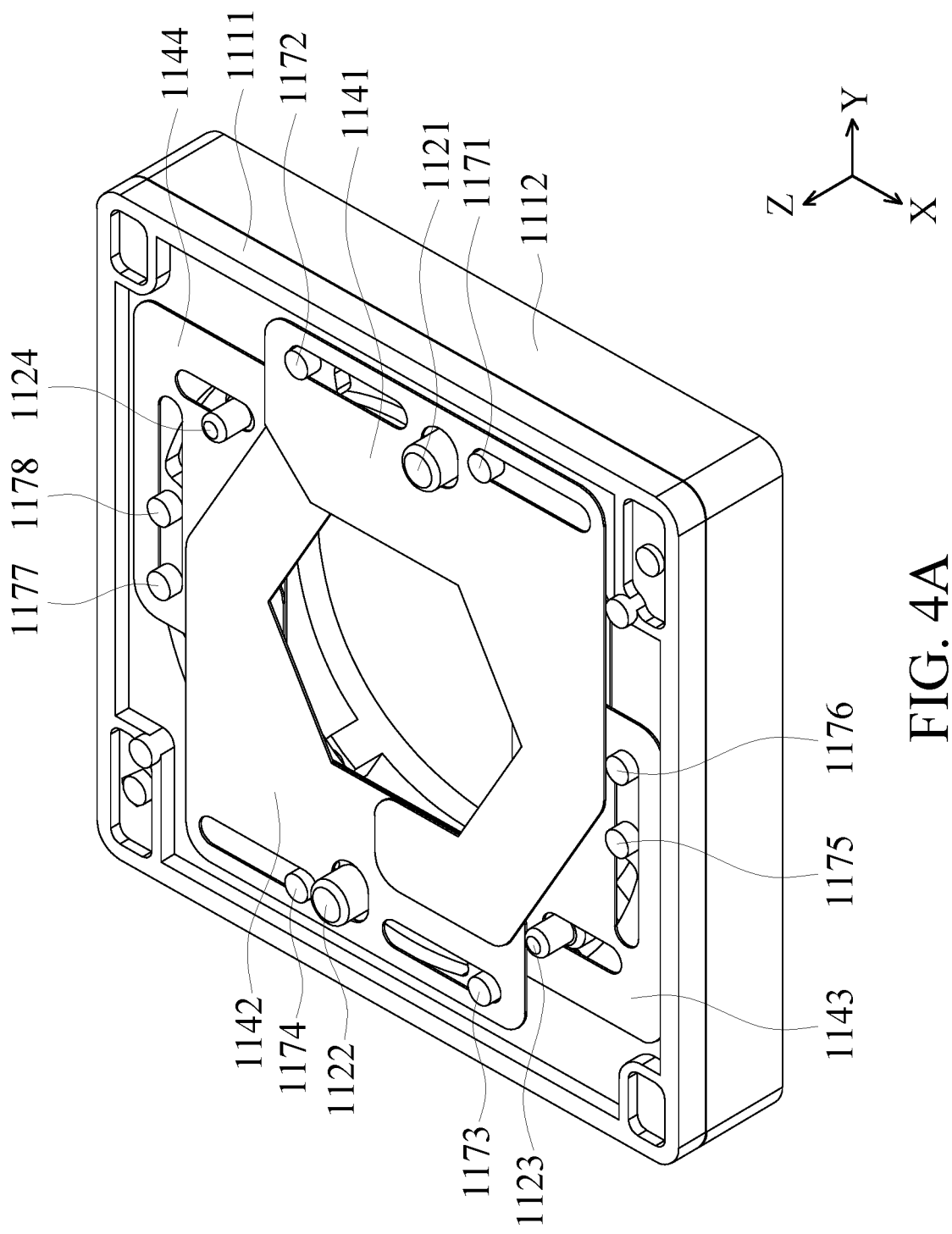
FIG. 4A to FIG. 4C are schematic views of some elements of the light amount adjusting mechanism when the movable portion rotates in the clockwise direction
Figure 4B:
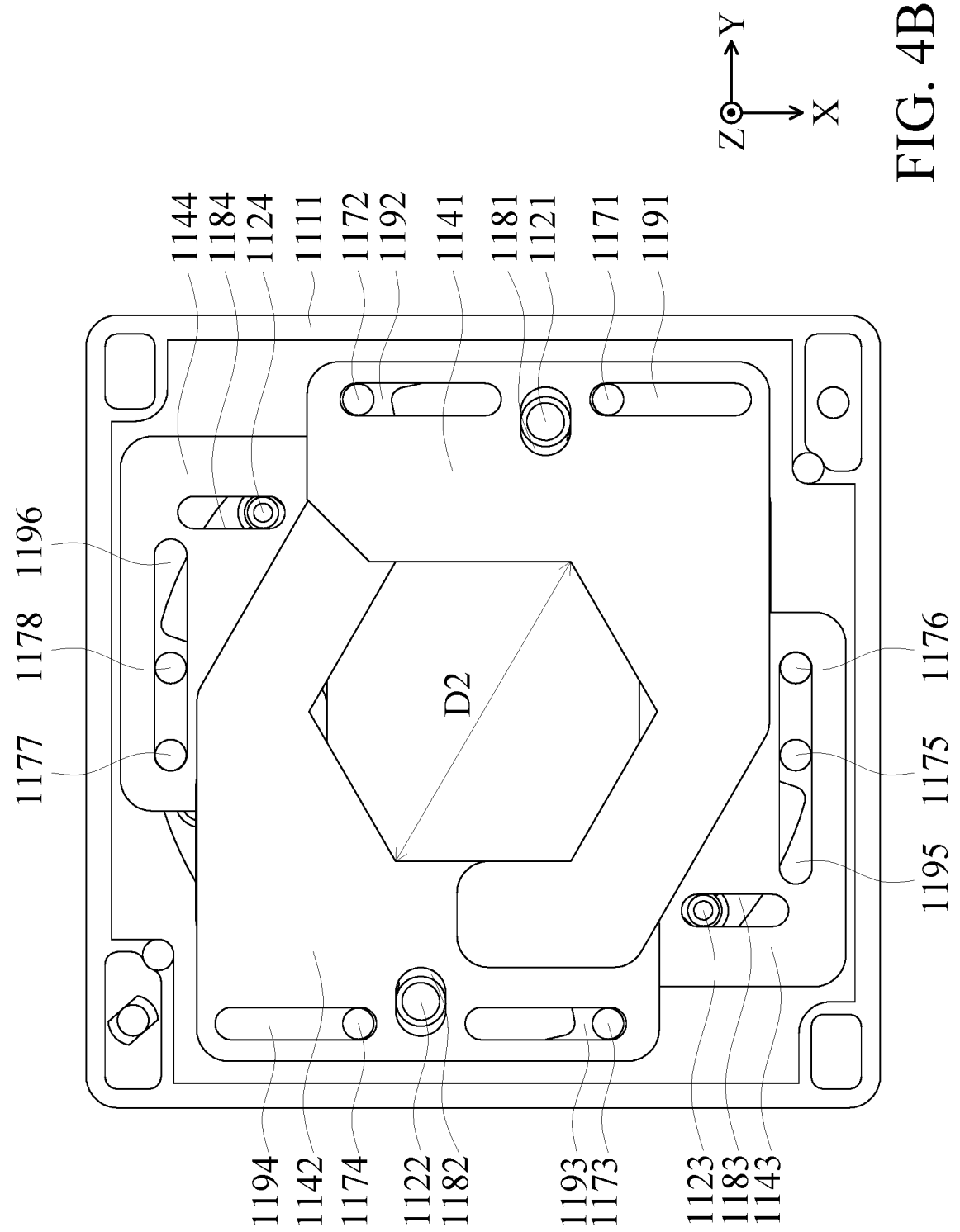
Figure 4C:
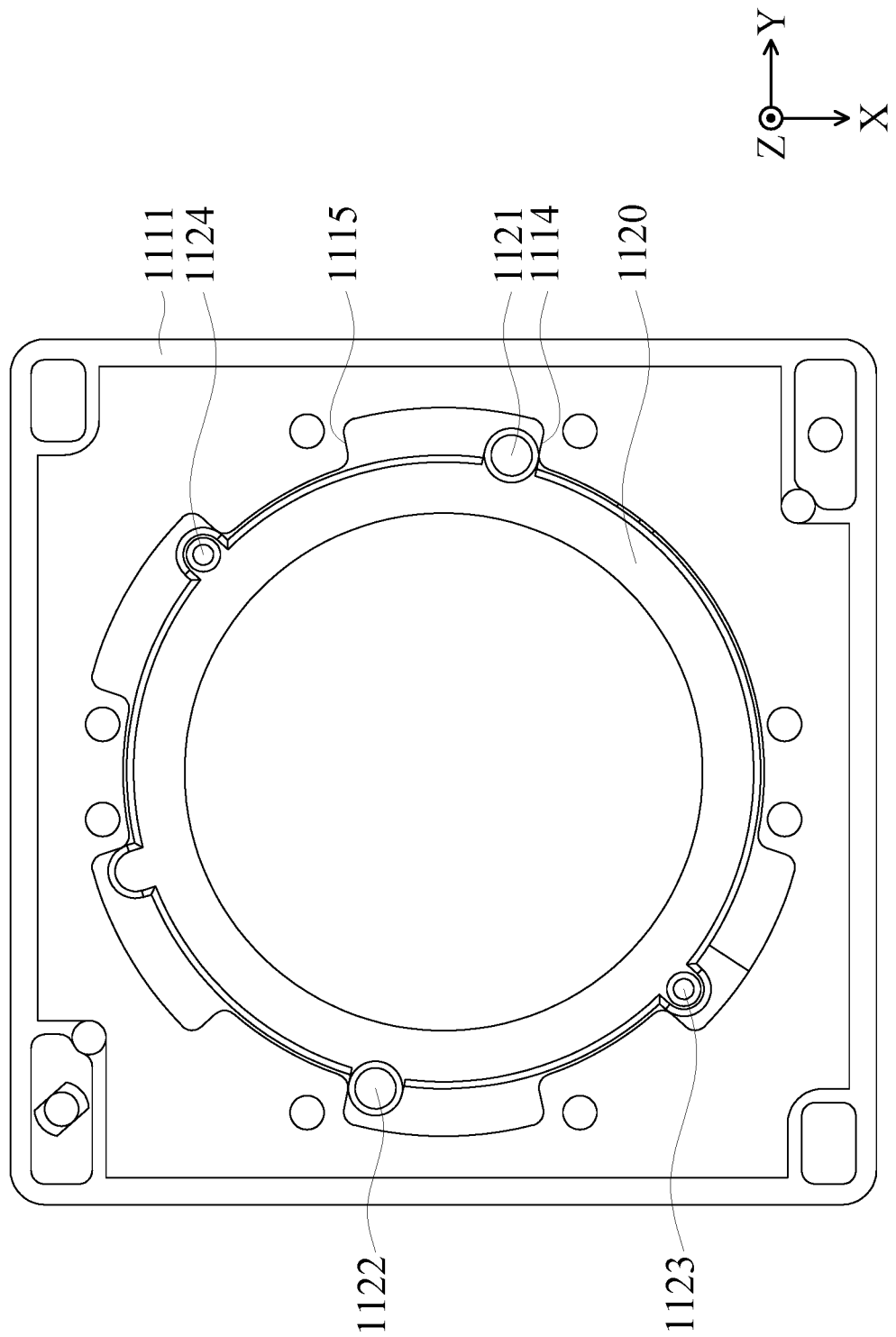

FIG. 4A to FIG. 4C are schematic views of some elements of the light amount adjusting mechanism 1100 when the movable portion 1120 rotates in the clockwise direction (first dimension), wherein similar elements in FIG. 3A to FIG. 3C are shown. As shown in FIG. 4A to FIG. 4C, when the movable portion 1120 rotates in the clockwise direction until the first guiding portion 1121 being in contact with a first stopping portion 1114 of the case 1111, the opening defined by the first light amount control unit 1141, second light amount control unit 1142, third light amount control unit 1143, fourth light amount control unit 1144 has a size D2, wherein the size D2 is greater than the size D1. Therefore, the size of the opening may be adjusted.

Figure 5A:
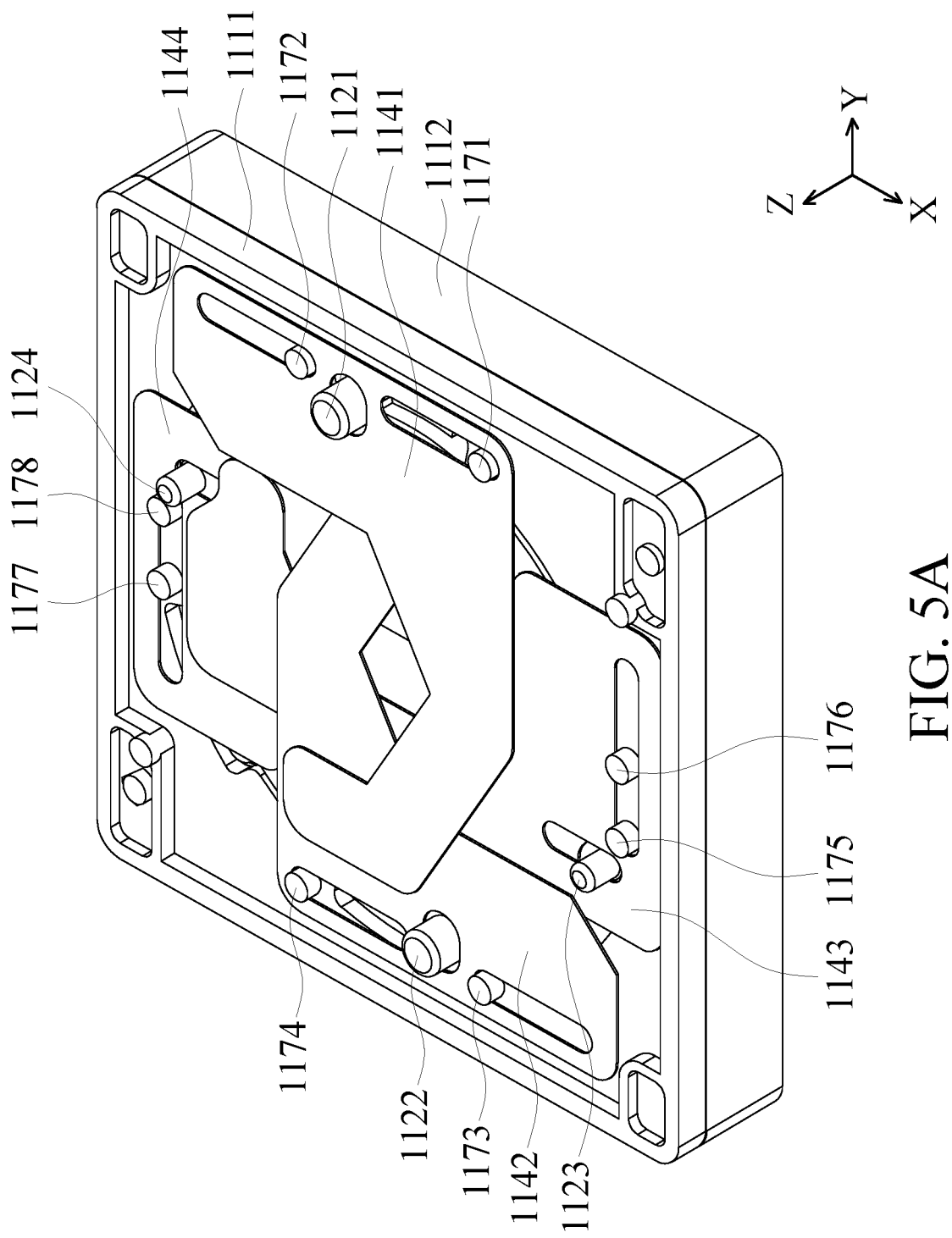
FIG. 5A to FIG. 5C are schematic views of some elements of the light amount adjusting mechanism when the movable portion rotates in the counterclockwise direction.
Figure 5B:
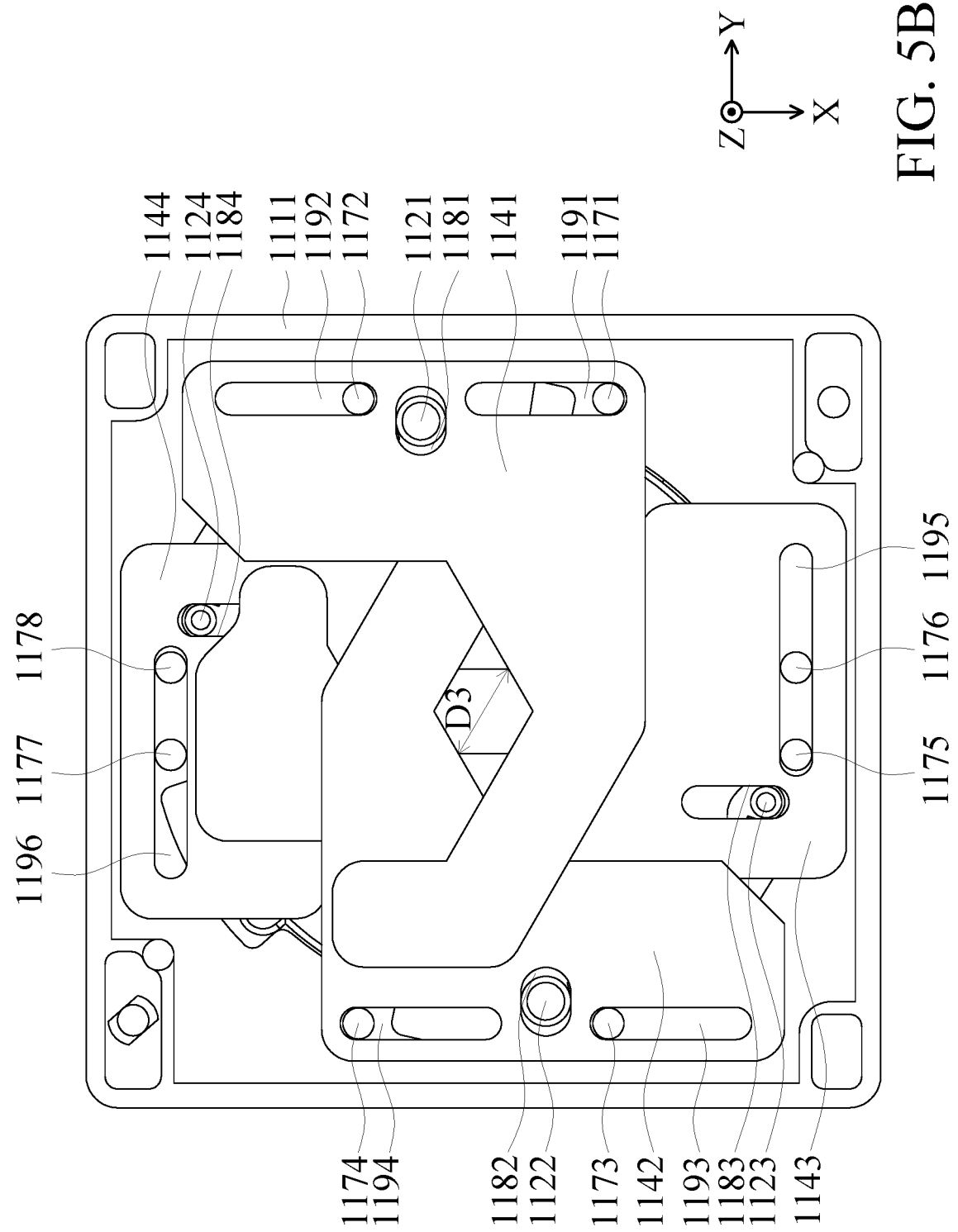
Figure 5C:
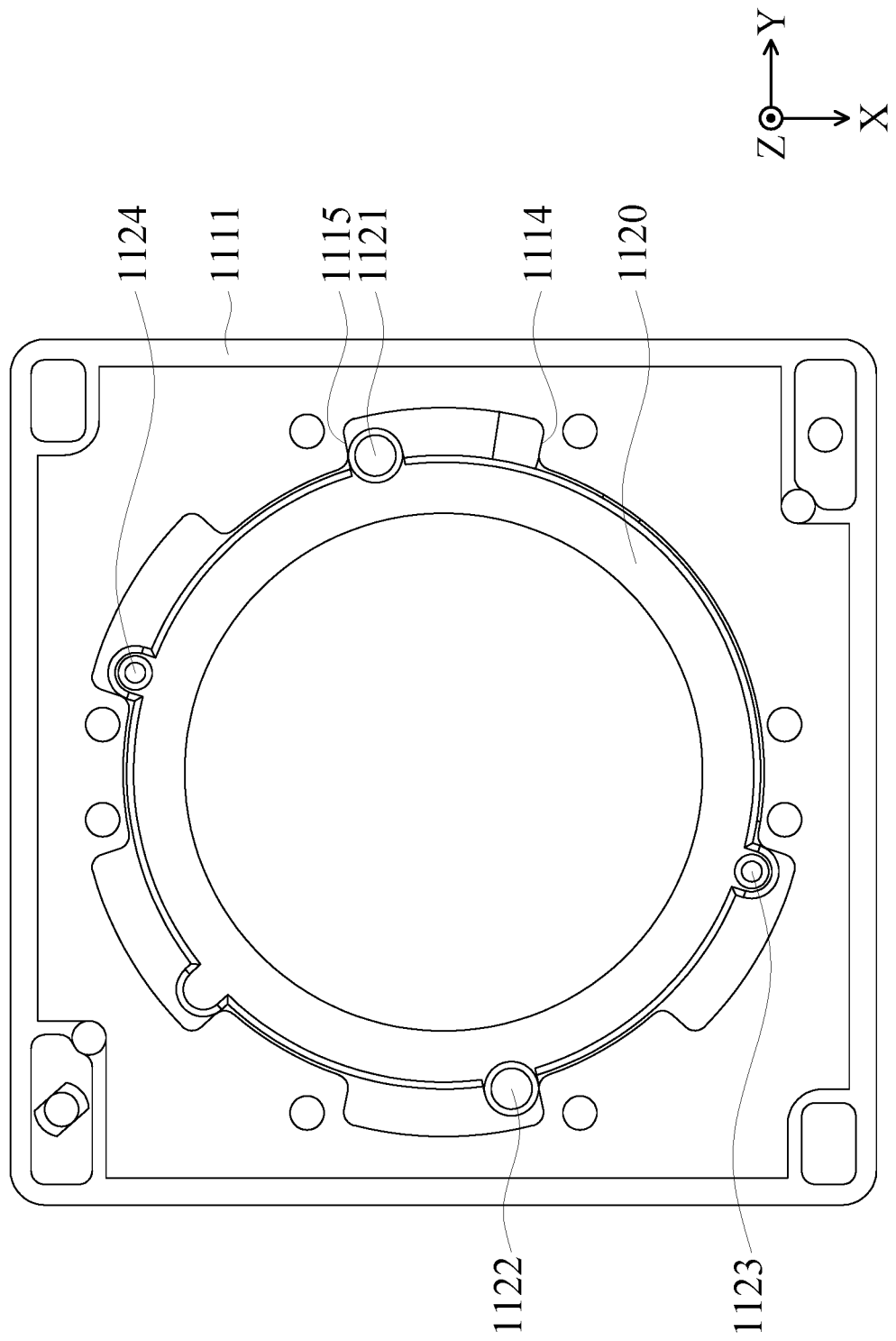

FIG. 5A to FIG. 5C are schematic views of some elements of the light amount adjusting mechanism 1100 when the movable portion 1120 rotates in the counterclockwise direction (second dimension), wherein similar elements in FIG. 3A to FIG. 3C are shown. As shown in FIG. 5A to FIG. 5C, when the movable portion 1120 rotates in the clockwise direction until the first guiding portion 1121 being in contact with a second stopping portion 1115 of the case 1111, the opening defined by the first light amount control unit 1141, second light amount control unit 1142, third light amount control unit 1143, fourth light amount control unit 1144 has a size D3, wherein the size D3 is less than the size D1 and the size D2. Therefore, the size of the opening may be adjusted.

Figure 6:
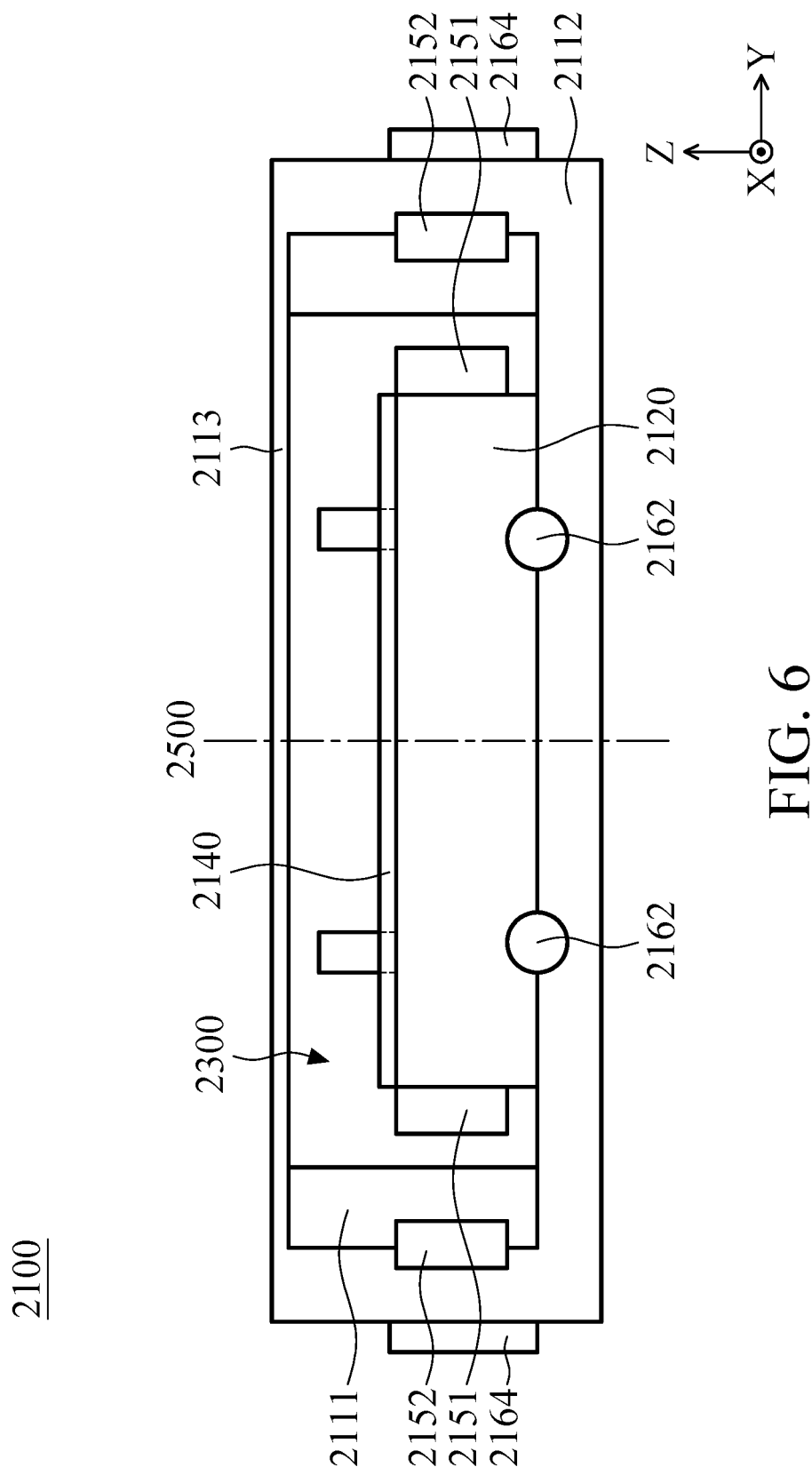
FIG. 6 is a schematic view of a light amount adjusting mechanism in some embodiments of the present disclosure.

FIG. 6 is a schematic view of a light amount adjusting mechanism 2100 in some embodiments of the present disclosure. In some embodiments, the light amount adjusting mechanism 2100 may mainly include a case 2111, a bottom 2112, a top plate 2113, a movable portion 2120, a light amount control element 2140, a first driving element 2151, a first driving element 2152, a connecting element 2162, and a magnetic conductive element 2164 arranged in a main axis 2500. The light amount adjusting mechanism 2100 may substitute the light amount adjusting mechanism 1100 to be disposed in the optical module 1001 or the optical module 1002 to control the amount or characteristic of light incident to the optical element 1230. The case 2111, the bottom 2112, the top plate 2113 may form an accommodating space 2300 to accommodating other elements. The functions of the case 2111, the bottom 2112, the top plate 2113, the movable portion 2120, the light amount control element 2140, the first driving element 2151, the first driving element 2152, the connecting element 2162, the magnetic conductive element 2164 may be identical or similar to the case 1111, the bottom 1112, the top plate 1113, the movable portion 1120, the light amount control element 1140, the first driving element 1151, the second driving element 1152, the connecting element 1162, and the magnetic conductive element 1164, and are not descripted again.

As shown in FIG. 6, in some embodiments, the first driving element 2151 and the first driving element 2152 may arrange in a direction that is perpendicular to the main axis 2500, and the magnetic conductive element 2164 and the first driving element 2151 are also arranged in the direction that is perpendicular to the main axis 2500. The first driving element 2152 may be between the magnetic conductive element 2164 and the first driving element 2151. Therefore, the movable portion 2120 may be driven to move relative to the case 2111 or the bottom 2112 to control the light amount control element 2140, so the amount or characteristic of the light incident to the optical element 1230 may be controlled.

An optical module is provided in some embodiments of the present disclosure. The optical module includes a holder for connecting to an optical element and a heat control assembly used for controlling the temperature of the optical element. The heat control assembly corresponds to the optical element or the holder. Therefore, the heat generated from elements other may be prevented from affecting the optical element, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical module, comprising:
   a holder for connecting to an optical element;
   a heat control assembly used for controlling the temperature of the optical element, wherein the heat control assembly corresponds to the optical element or the holder, and the heat control assembly comprises a first heat control element used for isolating heat generated from a heat source transferred to the optical element by heat conduction; and
   a first adhesive element,
   wherein the holder connects to the optical element through the first adhesive element,
   wherein the first adhesive element is in direct contact with the holder,
   wherein the first adhesive element is in direct contact with the optical element, and
   wherein the heat conductivity of the first heat control element is less than the heat conductivity of the first adhesive element.

2. The optical module as claimed in claim 1, wherein the heat control assembly further comprises:
   a second heat control element used for dissipating the heat generated by the heat source away from the optical element by heat conduction,
   wherein the heat conductivity of the first heat control element is less than the heat conductivity of the second heat control element,
   wherein the distance between the first heat control element and the optical element is less than the distance between the second heat control element and the optical element, and;
   wherein the first heat control element is between the optical element and the second heat control element.

3. The optical module as claimed in claim 2, wherein:
   the material of the first adhesive element comprises nonmetal element;
   the optical element comprises a camera lens;
   the camera lens comprises a lens barrel and at least one lens;
   the material of the lens barrel comprises nonmetal material;
   the heat conductivity of the lens barrel is different from the heat conductivity of the holder.

4. The optical module as claimed in claim 3, further comprising a light adjusting mechanism used for controlling the amount or characteristic of light incident to the optical element, wherein the light adjusting mechanism comprises:
   a movable portion used for connecting to a light amount control element;
   a fixed portion, wherein the movable portion is movable relative to the fixed portion; and
   a first driving assembly used for driving the movable portion to move relative to the fixed portion.

5. The optical module as claimed in claim 4, wherein:
   the first driving assembly is the heat source;
   the movable portion and the fixed portion arrange in a main axis;
   the material of the second heat control element comprises metal;
   the second heat control element is affixed on the fixed portion;
   the second heat control element is embedded in a bottom of the fixed portion;
   the material of the bottom comprises nonmetal material;
   the heat conductivity of the lens barrel is higher than the heat conductivity of the holder.

6. The optical module as claimed in claim 5, wherein:
   the second heat control element is exposed from a first surface of the holder facing away from the optical element;
   the second heat control element is not exposed from a second surface of the holder facing the optical element;
   the fixed portion further comprises a case, and the material of the case comprises metal;
   the distance between the bottom and the optical element is less than the distance between the case and the optical element.

7. The optical module as claimed in claim 6, wherein:
   the second heat control element connects to the case;
   the heat generated from the heat source is transferred to the case through the second heat control element;

the heat conductivity of the bottom is less than the heat conductivity of the case;

the heat conductivity of the second heat control element is higher than the heat conductivity of the case;

an accommodating space is formed in the case and the bottom and is used for accommodating the movable portion.

8. The optical module as claimed in claim 7, wherein:

the light amount control element comprises:

a first light amount control unit movably connected to the movable portion;

a second light amount control unit movably connected to the movable portion;

a third light amount control unit movably connected to the movable portion; and a fourth light amount control unit movably connected to the movable portion.

9. The optical module as claimed in claim 8, wherein:

when viewed along the main axis:

the first light amount control unit comprises a first guiding recess extending in a first direction;

the second light amount control unit comprises a second guiding recess extending in the first direction;

the third light amount control unit comprises a third guiding recess extending in a second direction;

the fourth light amount control unit comprises a fourth guiding recess extending in the second direction.

10. The optical module as claimed in claim 9, wherein:

the movable portion comprises a first guiding portion, a second guiding portion, a third guiding portion, and a fourth guiding portion extending in the main axis;

the first guiding portion is disposed in the first guiding recess;

the second guiding portion is disposed in the second guiding recess;

the third guiding portion is disposed in the third guiding recess;

the fourth guiding portion is disposed in the fourth guiding recess.

11. The optical module as claimed in claim 10, wherein:

the first light control unit further comprises a first positioning recess and a second positioning recess extending in the second direction;

the second light control unit further comprises a third positioning recess and a fourth positioning recess extending in the second direction;

the third light control unit further comprises a fifth positioning recess extending in the first direction;

the fourth light control unit further comprises a sixth positioning recess extending in the first direction;

the case comprises a first positioning portion, a second positioning portion, a third positioning portion, a fourth positioning portion, a fifth positioning portion, a sixth positioning portion, a seventh positioning portion, and an eighth positioning portion extending in the main axis.

12. The optical module as claimed in claim 11, wherein:

the first positioning portion is disposed in the first positioning recess;

the second positioning portion is disposed in the second positioning recess;

the third positioning portion is disposed in the third positioning recess;

the fourth positioning portion is disposed in the fourth positioning recess;

the fifth positioning portion and the sixth positioning portion are disposed in the fifth positioning recess;

the seventh positioning portion and the eighth positioning portion are disposed in the sixth positioning recess.

13. The optical module as claimed in claim 12, wherein:

the first positioning portion and the second positioning portion are arranged in the second direction;

the third positioning portion and the fourth positioning portion are arranged in the second direction;

the fifth positioning portion and the sixth positioning portion are arranged in the first direction;

the seventh positioning portion and the eighth positioning portion are arranged in the first direction.

14. The optical module as claimed in claim 13, wherein:

the first light amount control element, the second light amount control element, the third light amount control element, and the fourth light amount control element forms an opening;

when the movable portion rotates in a first dimension until the first guiding portion being in contact with a first stopping portion of the case, the opening has a first size;

when the movable portion rotates in a second dimension until the first guiding portion being in contact with a second stopping portion of the case, the opening has a second size;

the first dimension and the second dimension are different;

the first size and the second size are different.

15. The optical module as claimed in claim 14, wherein the light amount adjusting mechanism further comprises:

a resilient element disposed on the bottom;

a magnetic conductive element corresponding to the first driving assembly; and a position sensor corresponding to the first driving assembly;

wherein the movable portion further comprises a recess, and the resilient element is disposed in the recess;

the size of the recess is greater than the size of the resilient element.

16. The optical module as claimed in claim 15, wherein:

the first driving assembly comprises a first driving element and a second driving element used for generating a driving force to move the movable portion relative to the fixed portion;

the first driving element and the second driving element are arranged in the main axis;

the magnetic conductive element and the first driving element are arranged in the main axis.

17. The optical module as claimed in claim 15, wherein:

the first driving assembly comprises a first driving element and a second driving element used for generating a driving force to move the movable portion relative to the fixed portion;

the first driving element and the second driving element are arranged in a direction perpendicular the main axis;

the magnetic conductive element and the first driving element are arranged in the direction perpendicular the main axis.

18. The optical module as claimed in claim 15, wherein:

the first heat control element is a second adhesive element, and the second heat control element is connected to the optical element through the first heat control element;

the material of the second adhesive element comprises nonmetal material.

19. The optical module as claimed in claim 15, wherein:

the first heat control element is a gap between the bottom and the optical element;

the bottom is affixed on the holder;

the bottom is affixed on the holder through a third adhesive element;

the heat conductivity of the third adhesive element is different from the heat conductivity of the first adhesive element.

* * * * *